March 26, 1968  A. J. DE ROSSET  3,375,288
DEHYDROGENATION OF HYDROCARBONS AT HIGH CONVERSION LEVELS
Filed Oct. 28, 1964

INVENTOR:
Armand J. deRosset

BY: *James R. Hootson Jr.*
*William H. Page II*
ATTORNEYS 3,375,288
DEHYDROGENATION OF HYDROCARBONS AT HIGH CONVERSION LEVELS
Armand J. de Rosset, Clarendon Hills, Ill., assignor to Universal Oil Products Company, Des Plaines, Ill., a corporation of Delaware
Filed Oct. 28, 1964, Ser. No. 407,450
9 Claims. (Cl. 260—669)

ABSTRACT OF THE DISCLOSURE

A hydrocarbon is subjected to dehydrogenation in contact with one side of a silver membrane. An oxygen-containing gas is maintained in contact with the other side of the membrane. Oxygen is diffused through the membrane to oxidize the resulting free hydrogen, liberated during the course of the dehydrogenation, thereby lowering the hydrogen partial pressure of the reaction mixture. This permits the reaction to proceed at a relatively low temperature and with high selectivity toward the desired less saturated hydrocarbon product.

---

Figure 1:
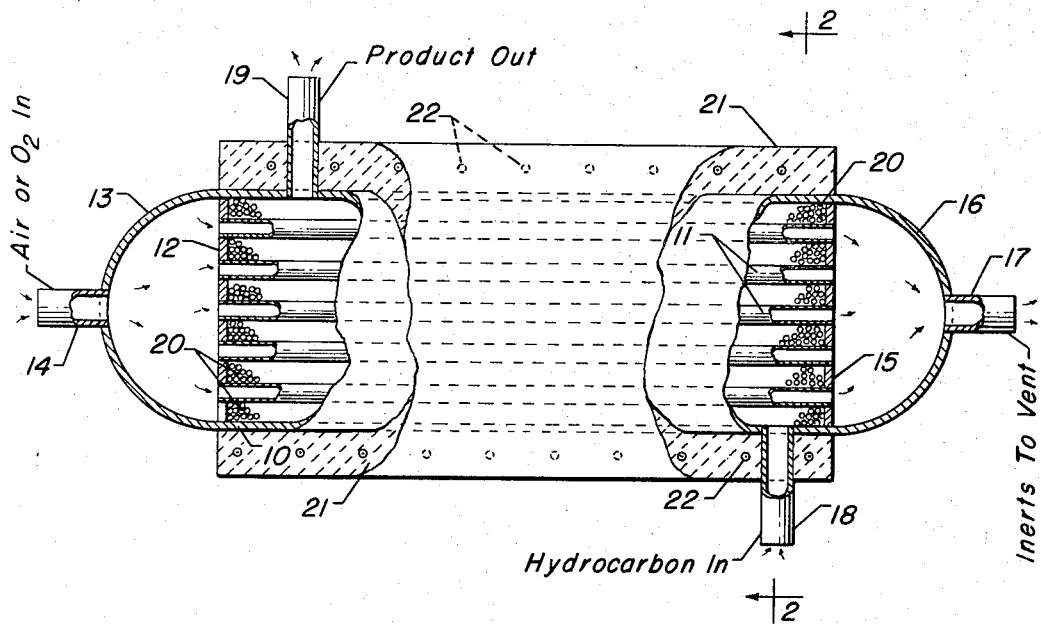

This invention relates to an improved process for the dehydrogenation of hydrocarbons. More particularly, the invention is directed to a method for reducing the hydrogen activity of the dehydrogenation equilibrium mixture whereby to increase the olefin:feed equilibrium ratio of the product. This technique permits the use of substantially lower dehydrogenation temperatures than are conventionally employed and achieves greater yields per pass and higher selectivity.

The reduction of hydrogen activity is accomplished through the use of a thin metallic silver wall or membrane one side of which contacts the dehydrogenation zone proper and the other side of which contacts a free oxygen-containing atmosphere. The membrane is arranged to isolate the dehydrogenation zone from the oxygen-containing atmosphere while at the same time affording a diffusive flow path therebetween. The silver membrane has a high permeability to oxygen, whereby the oxygen diffuses through the membrane to oxidize the free hydrogen liberated in the dehydrogenation zone. Because the oxygen transfer is diffusion controlled, the combustion of hydrogen takes place in a thin filmular oxidation zone along the surface of the membrane and does not propagate itself generally throughout the dehydrogenation zone. The selective removal of hydrogen decreases its partial pressure and the dehydrogenation reaction proceeds to completion at a relatively low temperature.

The process of this invention may be advantageously practiced by means of a novel tubular reactor comprising inner and outer tubes, at least a portion of the wall of the inner tube consisting of a thin silver membrane adapted to permit diffusive flow of oxygen therethrough, together with means for heating the tubes to dehydrogenation temperature, means for introducing a gaseous hydrocarbon feed into one of said tubes and for withdrawing product therefrom, and means for introducing an oxygen-containing gas into the other of said tubes. The interior of the inner tube may be the dehydrogenation zone and the annular space between the tubes may be the oxygen supply zone; conversely, the interior of the inner tube may be the oxygen supply zone and the annular space between the tubes may serve as the dehydrogenation zone. In a preferred embodiment of the apparatus, the reactor comprises a bundle of thin-walled silver tubes mounted within a single outer tube or shell, as in the familiar shell-and-tube heat exchanger. The increased surface area of the multiple tube design affords higher oxygen transfer rates.

The dehydrogenation reaction may be carried out thermally or catalytically, preferably the latter. For thermal conversions, the dehydrogenation zone may be left empty or it may be filled with inert heat conductive packing or heat transfer pebbles. For catalytic conversions, the catalyst may be suitably deposited as a thin film upon the wall of the dehydrogenation zone, using vapor deposition or impregnation techniques; alternatively, the dehydrogenation zone may comprise a bed of catalyst particles. The various dehydrogenation catalysts suitable for use in the present invention are well known in the art and they include, for example, alumina, chromia-alumina, chromia-magnesia, chromia-beryllia-alumina, ferria-alumina, ferria-magnesia, platinum group metals in general, particularly platinum-alumina and nickel oxide-alumina, oxides of strontium, barium and molybdenum, ortho-phosphoric acid, various alkali or alkaline earth metals, cupric oxide in combination with a stabilizer such as an oxide of silver, zinc, cadmium, cobalt or nickel. Typical specific compositions include, for example, 3–60% chromia on alumina, 10–20% $Fe_2O_3$ on alumina, 30 chromia-10 beryllia-50 alumina, with any of the foregoing being promoted by the addition of 1–8% potassia or cupric oxide. Another composition suited for use in dehydrogenation reactions is 10–30% $Fe_2O_3$ plus 3–8% $K_2O$ plus 62–87% CuO. The particular composition of a given catalyst as it may be employed in the present invention will, of course, be determined in accordance with the particular feed stock, reaction conditions and extent of conversion desired, in a manner known to those skilled in the art.

The apparatus and process of this invention are generally applicable in the dehydrogenation of alkanes, alkenes and alkyl aromatics, and more particularly in the dehydrogenation of n-alkanes or iso-alkanes containing 3 to 6 carbon atoms per molecule to the corresponding n-alkenes or iso-alkenes or, in a single stage, to the corresponding n-alkadienes or iso-alkadienes; further, in the dehydrogenation of n-alkenes or iso-alkenes containing 3 to 6 carbon atoms per molecule to the corresponding n-alkadiene or iso-alkadiene, particularly the conjugated dienes; still further, in the dehydrogenation of an alkylbenzene or alkylnaphthalene, in which the alkyl group contains 2 to 6 carbon atoms, to the alkylene benzene or alkylene naphthalene. Some of the more commercially important conversions include, for example, the dehydrogenation of propane to propylene, n-butane to 1-butene, n-butane to 1,3-butadiene, 1-butene to 1,3-butadiene, cis-2-butene or trans-2-butene to 1,3-butadiene, 1-pentene to 1,3-pentadiene, 2-methyl-1-butene to isoprene, ethylbenzene to styrene, isopropylbenzene to methyl styrene, and ethylnaphthalene to vinyl napthalene.

Catalytic dehydrogenation processes of the prior art require relatively high temperatures to achieve commercially significant conversions, generally in the range of 1000°–1200° F. The present invention, on the other hand, affords substantial conversions at lower temperatures, generally in the range of 800°–1000° F. when a catalyst is employed. Feed partial pressures may range from a new millimeters Hg absolute to 50 p.s.i.a. or more, and space velocities from 0.2 to 1000 volumes of hydrocarbon feed/volume of catalyst/hour.

It is, therefore, a further aspect of the invention to provide an improved process for the dehydrogenation of a hydrocarbon feed stock wherein the feed is reacted in a dehydrogenation zone under dehydrogenation conditions to yield a less saturated hydrocarbon and free hydrogen, which improvement is specifically directed to reducing the hydrogen activity of the reaction mixture and which comprises contacting the reaction mixture, while undergoing dehydrogenation, with one side of a thin silver membrane, maintaining an oxygen-containing gas in contact with the other side of said membrane, and diffusing oxygen through the membrane into the dehydrogenation zone to oxidize such free hydrogen and thereby lower its partial pressure so that the dehydrogenation of the hydrocarbon proceeds to completion at a relatively low temperature. This in turn affords a significantly increased level of conversion and higher selectivity toward the desired olefinic product.

The present invention may be more clearly understood by reference to the accompanying drawing, which illustrates a preferred apparatus for carrying out the process but it is not intended that the apparatus therein illustrated shall limit the scope of the invention to any greater extent than is required by the claims.

Figure 2:
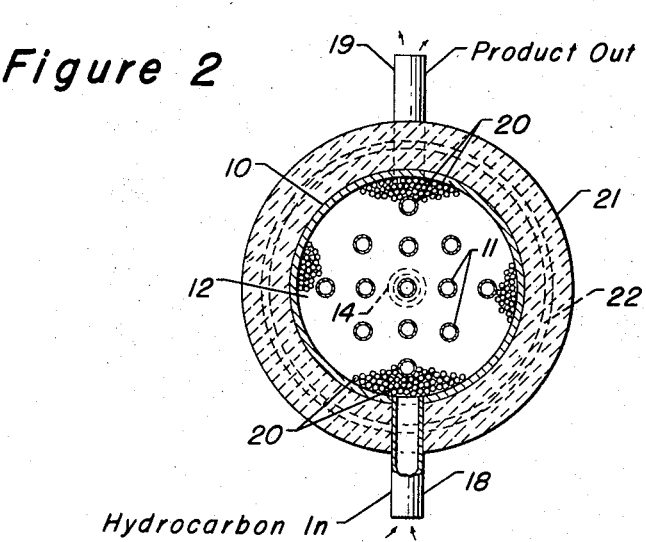

FIGURE 1 is a sectional view of a multiple tube reactor. FIGURE 2 is a transverse view of the apparatus of FIGURE 1, taken along line 2—2 of FIGURE 1.

With reference to FIGURES 1 and 2, the reactor is comprised of an outer shell 10 and an inner bundle of tubes 11. Tubes 11 typically have an outside diameter of 0.01 inch to 0.5 inch and a wall thickness of 0.001 inch to 0.01 inch, although greater or lesser diameters and thicknesses may be utilized when desired. The ends of tubes 11 are suitably rolled or welded to tube sheets 12 and 15. Tube sheet 12 and head 13 define an inlet manifold to which air or oxygen is introduced through an inlet conduit 14; tube sheet 15 together with head 16 define an outlet manifold from which inerts may be vented through conduit 17. A particle-form bed of dehydrogenation catalyst 20 is disposed outside tubes 11; alternatively, areas of the exterior surface of tubes 11 may be coated with dehydrogenation catalyst. Shell 10 is encased by a refractory block 21 which in turn may be heated by conventional means such as electric coils 22 embedded therein. Heat transfer from block 21 to the shell and tube assembly serves to maintain the reaction zone at the desired elevated temperature.

Hydrocarbon vapor feed is introduced into shell 10 through feed inlet conduit 18; the feed may be diluted with steam, nitrogen, carbon dioxide or other inert gas for partial pressure control in the usual manner. Dehydrogenation reaction product is withdrawn from the other end of shell 10 through an outlet conduit 19. A free oxygen-containing gas is introduced into inlet conduit 14; such oxygen-containing gas may be pure oxygen, air or a blend of oxygen with steam or nitrogen. The total pressure of the oxygen-containing gas within tubes 11 is maintained substantially above the total pressure existing outside tubes 11; for example, the pressure differential may range from about 10 p.s.i. to about 1000 p.s.i. depending upon the wall thickness of tubes 11. Obviously the pressure differential should not be so great as to cause rupture of the tubes. The pressure of the oxygen-containing gas may be conveniently controlled by means of a differential pressure controller sensing the pressure of the oxygen-containing gas and the pressure of the dehydrogenation zone and the difference therebetween utilized to regulate the flow of oxygen-containing gas. The flow of oxygen through the tube walls is essentially diffusion-controlled. If pure oxygen is employed, the outlet conduit 17 may be omitted whereby tubes 11 merely define a dead-ended volume of oxygen. However, where the oxygen-containing gas comprises inerts such as introgen, water vapor or carbon dioxide, it is preferred to maintain a continuous flow thereof through tubes 11 to prevent accumulation of inerts within the system and at the same time to facilitate pressure control of the oxygen-containing gas. Gas which is depleted in oxygen may be withdrawn from outlet conduit 17, enriched by addition of make-up oxygen, and recycled to inlet conduit 14. It is, of course, within the scope of the present invention to reverse the functions of the shell and tubes whereby the tubes serve as the dehydrogenation zone and air or other oxygen-containing gas is charged to the shell side of the reactor; with this latter construction, the interior surfaces of tubes 11 may be coated with a suitable dehydrogenation catalyst or the tubes may be filled with a solid dehydrogenation catalyst distended upon a porous support or carrier.

The benefits afforded by the invention are further illustrated by the following specific examples. It is not intended, however, that the invention be limited to the particular reactants, catalysts or conditions specified therein.

EXAMPLE I

*Butane dehydrogenation*

A first tubular reactor, designated reactor A, is constructed as shown in the drawing. The outer shell has an inside diameter of 2.5 inches. The inner tube bundle is 2.25 inches in diameter and 24 inches long and comprises 500 silver tubes, 1/16 inch O.D. of 0.002 inch wall thickness. The tubes are welded to tube sheets which are sealed to the outer shell. A second tubular reactor, designated reactor B, is similarly constructed except that the inner tubes are conventionally formed of a fluid-impervious stainless steel. Each reactor is loaded with 1000 cc. of 20–40 mesh dehydrogenation catalyst having the composition 5 $Cr_2O_3$–95 $Al_2O_3$. The reactors are installed in a thermostatically controlled muffle furnace. Gaseous butane is fed to the shell of each and air is passed through the tube bundle. The butane feed and air streams are preheated to reaction temperature before entering the reactor. The pressure of the air stream in the bundle is maintained at 700 p.s.i.a. Conditions and results for a 30 minute period of lined out operation are given in Table I below. All flows are gas volume corrected to standard conditions of temperature and pressure.

TABLE I

| | Reactor | |
|---|---|---|
| | A | B |
| Silver Membrane | Yes | No |
| Temperature, °F | 950 | 950 |
| Inlet butane pressure, p.s.i.a | 14.5 | 14.5 |
| Feed rate, cc./min | 2,000 | 2,000 |
| Air rate, cc./min | 3,000 | 3,000 |
| Butane conversion, mol percent | 21.3 | 0.5 |
| Selectivity to total n-butenes, percent | 92 | 95 |

EXAMPLE II

*Butene dehydrogenation*

The two reactors of Example I are utilized with the following changes: each reactor is loaded with 1000 cc. of a dehydrogenation catalyst having the composition 84 $Fe_2O_3$–4 $Cr_2O_3$–12 $K_2CO_3$; the feed is 97% 1-butene; means are provided for diluting the feed with 1000° F. steam. Conditions and results for a 30 minute period of lined out operation are given in Table II below.

TABLE II

| | Reactor | |
|---|---|---|
| | A | B |
| Silver Membrane | Yes | No |
| Temperature, °F | 1,000 | 1,000 |
| Inlet butene pressure, p.s.i.a | 17.1 | 17.1 |
| Feed rate, cc./min | 1,500 | 1,500 |
| Steam rate, cc./min | 16,200 | 16,200 |
| Air rate, cc./min | 2,350 | 2,350 |
| Butene conversion, mol percent | 20.8 | 0.0 |
| Selectivity to 1,3 $C_4H_6$, percent | 94 | |

EXAMPLE III

*Ethylbenzene dehydrogenation*

The two reactors of Example I are utilized with the following changes: each reactor is loaded with 1000 cc. 20–40 mesh granular catalyst having the composition 90 $Fe_2O_3$–4 $Cr_2O_3$–6 $K_2CO_3$; the feed is 98% ethylbenzene; means are provided for diluting the feed with 950° F. steam. Conditions and results for a 30 minute period of lined out operation are given in Table III below.

TABLE III

| | Reactor | |
|---|---|---|
| | A | B |
| Silver Membrane | Yes | No |
| Temperature, °F | 950 | 950 |
| Inlet ethylbenzene pressure, p.s.i.a | 19.2 | 19.2 |
| Feed rate, cc./min | 2 | 2 |
| Steam rate, cc./min | 22.5 | 22.5 |
| Air rate, cc./min | 2,000 | 2,000 |
| Ethylbenzene conversion, mol percent | 24.7 | 1.2 |
| Selectivity to styrene, percent | 93 | 91 |

As is evident from the foregoing examples, the present technique and apparatus achieves substantially higher conversions and selectivities at a given temperature than are obtainable with ordinary catalytic dehydrogenation processes of the prior art and, more particularly, permit the use of substantially lower dehydrogenation temperatures to effect a commercially significant degree of conversion.

I claim as my invention:

1. Process for the low temperature dehydrogenation of a hydrocarbon feed to form a less saturated hydrocarbon of corresponding structure and free hydrogen, which comprises reacting the feed under dehydrogenation conditions including a temperature of about 800° F. to about 1000° F., maintaining the dehydrogenation reaction mixture in contact with one side of a thin silver membrane, maintaining an oxygen-containing gas in contact with the other side of said membrane under a pressure sufficient to cause oxygen to diffuse therethrough, and diffusing oxygen through the membrane to oxidize said free hydrogen in a filmular oxidation zone adjacent the membrane, thereby lowering the hydrogen partial pressure of the reaction mixture.

2. Process of claim 1 wherein said membrane is tubular in form.

3. Process of claim 1 wherein said reaction is effected in contact with a dehydrogenation catalyst.

4. Process of claim 3 wherein said catalyst is coated on the dehydrogenation side of said membrane.

5. Process of claim 3 wherein said catalyst comprises a bed of particles.

6. Process of claim 3 wherein said catalyst comprises a platinum group metal.

7. Process of claim 1 wherein said hydrocarbon feed is a paraffin containing 3 to 6 carbon atoms per molecule.

8. Process of claim 1 wherein said hydrocarbon feed is a monoolefin containing 3 to 6 carbon atoms per molecule.

9. Process of claim 1 wherein said hydrocarbon feed is an alkyl benzene in which the alkyl group contains 2 to 6 carbon atoms.

References Cited

UNITED STATES PATENTS

| 2,387,731 | 10/1945 | Allen | 260—680 |
| 2,431,632 | 11/1947 | Brandt | 48—224 |
| 2,444,222 | 6/1948 | Craig | 48—224 |
| 3,290,406 | 12/1966 | Pfefferle | 260—683.3 |

DELBERT E. GANTZ, *Primary Examiner.*

C. R. DAVIS, *Assistant Examiner.*